United States Patent
Stackpoole et al.

(10) Patent No.: US 9,440,752 B1
(45) Date of Patent: Sep. 13, 2016

(54) MODIFICATION OF SURFACE DENSITY OF A POROUS MEDIUM

(71) Applicant: The United States of America as represented by the Administrator of the National Aeronautics & Space Administration (NASA), Washington, DC (US)

(72) Inventors: Margaret M. Stackpoole, Santa Clara, CA (US); Christian Espinoza, Urbana, IL (US)

(73) Assignee: The United States of America as Represented by the Administrator of the National Aeronautics and Space Administration (NASA), Washington, DC (US)

( * ) Notice: Subject to any disclaimer, the term of this patent is extended or adjusted under 35 U.S.C. 154(b) by 98 days.

(21) Appl. No.: 14/091,250

(22) Filed: Nov. 26, 2013

Related U.S. Application Data

(60) Provisional application No. 61/785,434, filed on Mar. 14, 2013.

(51) Int. Cl.
| | |
|---|---|
| *B32B 37/00* | (2006.01) |
| *B64G 1/58* | (2006.01) |
| *B05D 5/00* | (2006.01) |
| *B32B 38/08* | (2006.01) |
| *B64G 1/22* | (2006.01) |

(52) U.S. Cl.
CPC . *B64G 1/58* (2013.01); *B05D 5/00* (2013.01); *B32B 38/08* (2013.01); *B64G 1/226* (2013.01)

(58) Field of Classification Search
CPC .......... B64G 1/58; B64G 1/226; B05D 5/00; B32B 38/08
See application file for complete search history.

(56) References Cited

U.S. PATENT DOCUMENTS

| | | | |
|---|---|---|---|
| 3,526,607 A | * | 9/1970 | Brown et al. ................. 528/119 |
| 5,028,352 A | | 7/1991 | Hietala et al. |
| 5,236,151 A | | 8/1993 | Hagle et al. |

(Continued)

FOREIGN PATENT DOCUMENTS

| | | |
|---|---|---|
| EP | 2 644 261 A1 | 2/2013 |

OTHER PUBLICATIONS

Merriam-Webster definition of "room temperature" as captured by archive.org from merriam-webster.com Apr. 2009.*

*Primary Examiner* — John Goff
(74) *Attorney, Agent, or Firm* — John F. Schipper; Robert M. Padilla

(57) ABSTRACT

A method for increasing density of a region of a porous, phenolic bonded ("PPB") body adjacent to a selected surface to increase failure tensile strength of the adjacent region and/or to decrease surface recession at elevated temperatures. When the surface-densified PPB body is brought together with a substrate, having a higher failure tensile strength, to form a composite body with a PPB body/substrate interface, the location of tensile failure is moved to a location spaced apart from the interface, the failure tensile strength of the PPB body is increased, and surface recession of the material at elevated temperature is reduced. The method deposits and allows diffusion of a phenolic substance on the selected surface. The PPB body and the substrate may be heated and brought together to form the composite body. The phenolic substance is allowed to diffuse into the PPB body, to volatilize and to cure, to provide a processed body with an increased surface density.

14 Claims, 11 Drawing Sheets

(56) References Cited

U.S. PATENT DOCUMENTS

| | | | |
|---|---|---|---|
| 5,536,562 A * | 7/1996 | Tran et al. | 428/218 |
| 5,904,997 A * | 5/1999 | Daws | B64G 1/58 428/446 |
| 6,627,697 B2 | 9/2003 | Barney et al. | |
| 7,112,234 B2 | 9/2006 | Jha et al. | |
| 8,329,091 B2 | 12/2012 | Maffia | |
| 2003/0148081 A1 * | 8/2003 | Moody | 428/218 |

* cited by examiner

MODIFICATION OF SURFACE DENSITY OF A POROUS MEDIUM

ORIGIN OF THE INVENTION

The invention described herein was made in the performance of work under NASA contracts, and is subject to the provisions of Public Law 96-517 (35 U.S.C. §202) in which the Contractor has elected not to retain title.

FIELD OF THE INVENTION

This invention relates to increase of density of a porous medium, and more particularly to increase of density of a region adjacent to the surface.

BACKGROUND OF THE INVENTION

Some open pore materials used in thermal protection systems ("TPS s") have undesired associated surface effects that can interfere with functioning of the TPS. An example of this is phenolic impregnated carbon ablator ("PICA"), which is used and will be used to protect a space vehicle that is entering or re-entering an atmosphere surrounding a planet or satellite. A Strain Isolation Pad (SIP) may be required when bonding the PICA to the rigid aeroshell of a space vehicle. For example the SIP helps alleviate thermal expansion differences between the PICA and the substructure. If the PICA is bonded to the SIP, premature failure at strengths lower than the strength of the virgin PICA is observed at the PICA-SIP interface Additionally, some of the phenolic is often shed as a powder or other substance at room temperature or above, leading to handling problems. However, re-processing of the entire material (surface layers and bulk) after its initial fabrication may interfere with or degrade some of the desirable features of the material.

What is needed is a re-processing technique that: (1) does not add new chemical elements to the composition of the initial material; (2) does not require re-processing of the entire material; (3) allows some control over one or more resulting physical and/or chemical parameters of the re-processed material; (4) provides an improvement in one or more parameters (e.g., failure strength and failure location) associated with response to the real environment; (5) does not result in a substantial increase in density of the re-processed material; and (6) has an associated re-processing time that is relatively short (e.g., a few minutes to a few hours).

SUMMARY OF THE INVENTION

These needs are met by the invention, which provides a method for re-processing a surface region of a porous, open cell body or a Fiberform™ body (collectively referred to as a "PPB body" having first and second surfaces that are spaced apart by more than 20 mm). In one embodiment, a spray of a selected liquid, such as a mixture of phenolic, with ethanol ("Eth"), methanol ("Meth"), isopropyl alcohol ("IPA"), another alcohol, an ether, an aldehyde, a ketone, a carboxylic acid, and/or an ester as solvent, is applied to substantially uniformly cover a surface of a body of PICA or other PPB material, heated to a spraying temperature $T=T1=20-80°$ C. The selected liquid is allowed to diffuse into the PPB body, to a depth $h_d$ of the order of 1-20 mm, or greater if desired, relying in part on an open cell structure of the PPB material and upon a pressure-driven or temperature-driven or vacuum-driven transport mechanism. The spray/diffusion procedure may be repeated, if desired, to modify the resulting density profile of the surface region and/or to vary the thickness of the modified surface region. The surface-coated PPB body is then allowed to dry and to shed excess solvent for a drying time interval $\Delta t3=6-48$ hours, or longer if desired. The surface-coated and dried PPB body is temperature cured at a curing temperature, $T4=60-90°$ C., for a curing time interval $\Delta t4=6-24$ hours, and (optionally) at a supplemental curing temperature, $T5=100-150°$ C., for a supplemental curing time interval $\Delta t5=4-12$ hours. Optionally, the spraying-diffusion-drying-curing process is applied at one, two or more surfaces, such as two opposing surfaces of the PPB body. The initial open cell porous material may be PICA (a porous, open cell material) or a fibrous carbonaceous substitute, such as Fiberform™. The dimensions of a block of PPB material do not change substantially upon implementation of the density modification. The PPB body sprayed surface is brought together with a substrate (e.g., an exposed surface of a space vehicle) to form a composite body thermal protection system.

PICA (phenolic impregnated carbon ablator) is a phenolic-based ablator material developed at N.A.S.A Ames Research Center and is disclosed in U.S. Pat. Nos. 5,536, 562, 5,673,389 and 6,955,853, issued to Tran et al and incorporated by reference herein Carbon Fiberform™, available from FMI (Fiber Materials, Inc.), is a low density, rigid carbon fiber insulation material that is intended to perform at high temperatures, in a vacuum or in an inert heated atmosphere. The carbon fiber is a rayon-derived fiber. The carbon fibers have fiber diameters in a range 5-20 μm and are chopped or otherwise comminuted to produce fiber lengths in a range 100-1000+ μm. The resulting carbon fibers are then associated with or connected to each other using a phenolic, having a porosity in a range of about 80-95 percent, which is heat treated to form a rigid carbonaceous material. A porous, open cell body and a carbon fiberform each have high porosity, and the components are bound together by or defined by a phenolic. PPB body (which is converted to a Carbon body upon heating) and carbon fiberform material will be referred to collectively herein as a porous, phenolic bonded ("PPB") body or material.

DESCRIPTION OF THE INVENTION

Figure 1:
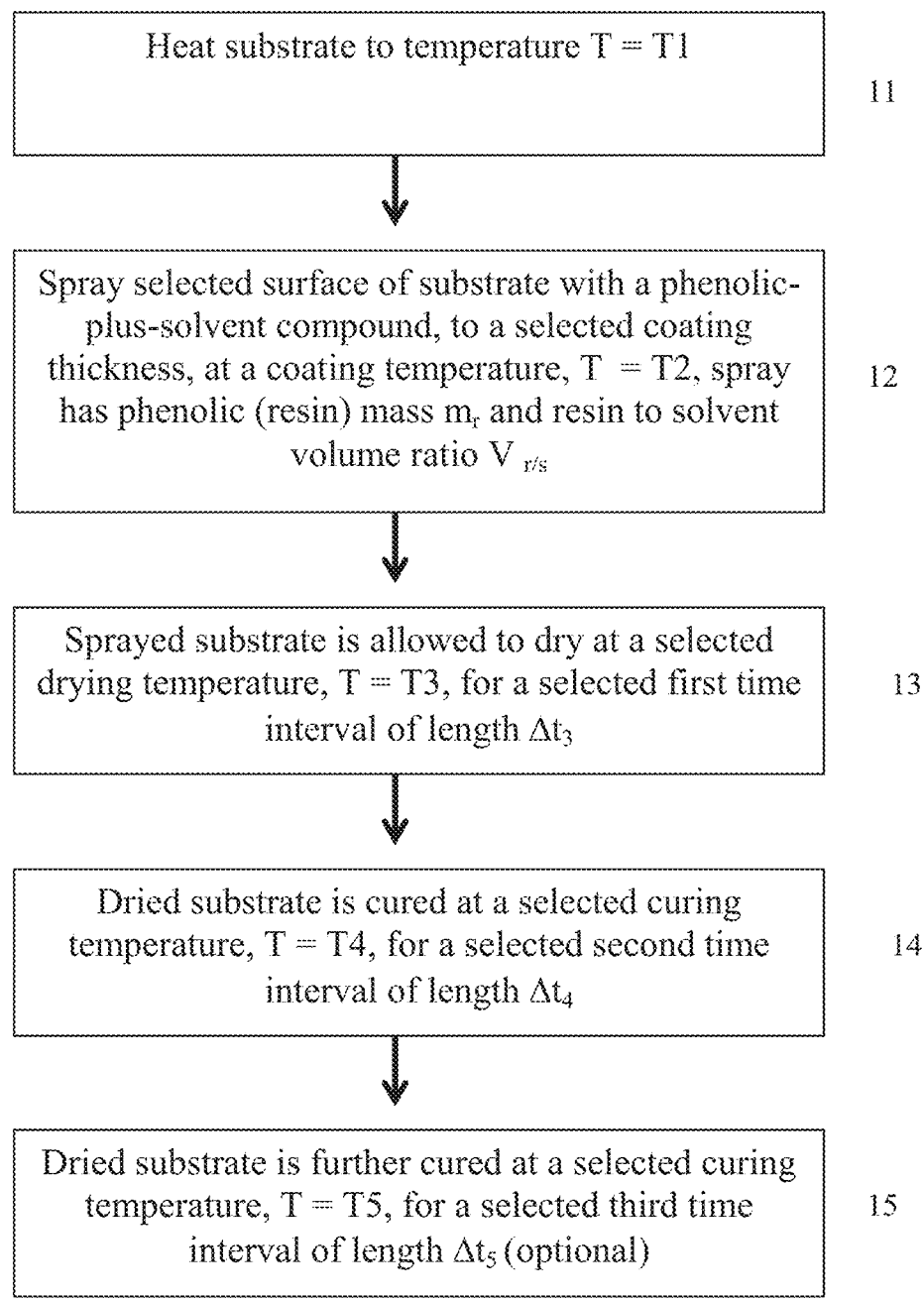
FIG. 1 is a flow chart of a procedure for practicing an embodiment of the invention.

FIG. 1 is a flow chart of a general method, according to one embodiment, for practicing the invention. In step 11, the PPB body is heated to a temperature T1=20-80° C. In step 12, a selected surface of PPB body (PICA, Fiberform™ or another suitable material) is sprayed with a substantially uniform thickness of a selected phenolic compound (resin), such as SC1008 or a resin from the cellabond family, which is mixed with a selected solvent (e.g., one or more of ethanol, methanol, isopropyl alcohol ("IPA"), another alcohol, an ether, an aldehyde, a ketone, a carboxylic acid, and an ester). This mixture has a resin mass $m_r$, has a resin-to-solvent volume ratio $V_{r/s}$ (Table 1), and is heated to a spraying temperature T2=20-80° C. The substance sprayed is allowed to penetrate or diffuse into the PPB body to a desired depth, shown as $h_d$ in FIG. 7a.

In step 13, the resulting sprayed PPB body is allowed to dry at a drying temperature, T3=20-90° C., which may be, but need not be, ambient temperature or the spraying temperature T2, for a drying time interval Δt3=6-48 hours. This drying process allows most or all of the solvent to volatilize and to thereby become removed from the PPB body. In step 14, the dried PPB body is cured at a third (curing) temperature, T4=60-90° C., for a curing time interval, Δt4=6-24 hours. In step 15 (optional), curing is continued at a subsequent (supplemental curing) temperature, T5=100-150° C., for a supplemental curing time interval, Δt5=3-12 hours. Optionally, steps 11, 12, 13 and/or 14 can be repeated as often as desired.

An optional step, the PPB body and a substrate are brought together (with or without pressing) at the sprayed surface(s), to form a composite body. The substrate may, for example, be part of an exposed (and subsequently heated) surface of a space vehicle or other body for which thermal protection is desirable. This step can be implemented before or after step 13, 14 or 15.

Several versions of the procedure, enumerated as Approaches 1a, 1b, 1c, 1d, 2a, 2b, 2c, 2d, 3b, 3c, 3d, 4b, 5a, 5b, 5c and 5d in Table 1, set forth in the following, have been studied, with different values of the following parameters: $m_r$=mass of resin/in² to be applied as a coating ($m_r$=0.3, 0.6, 1, 1.9, 3.8 or 7.6 gm/in²); $V_{r/s}$=resin-to-solvent volume ratio (1:0, 1:1, 1:2, 1:5 or 2:1); T2=resin temperature (ambient or 50° C.); T1 is PPB body temperature (ambient or 50° C.). The parameters for these approaches are set forth in Table 1. The resulting density profiles are substantially defined by the choice of one or more of (i) substrate material, (ii) T1, (iii) T2, (iv) choice of phenolic compound (resin), (v) choice of solvent, (vi) mass $m_r$ of resin used as coating, and (vii) volume ratio $V_{r/s}$ of resin-to-solvent, for a drying time interval Δt3 (≈6-48 hours) and a curing time interval Δt4 (=4-12 hours), for the diffusant.

Figure 2:
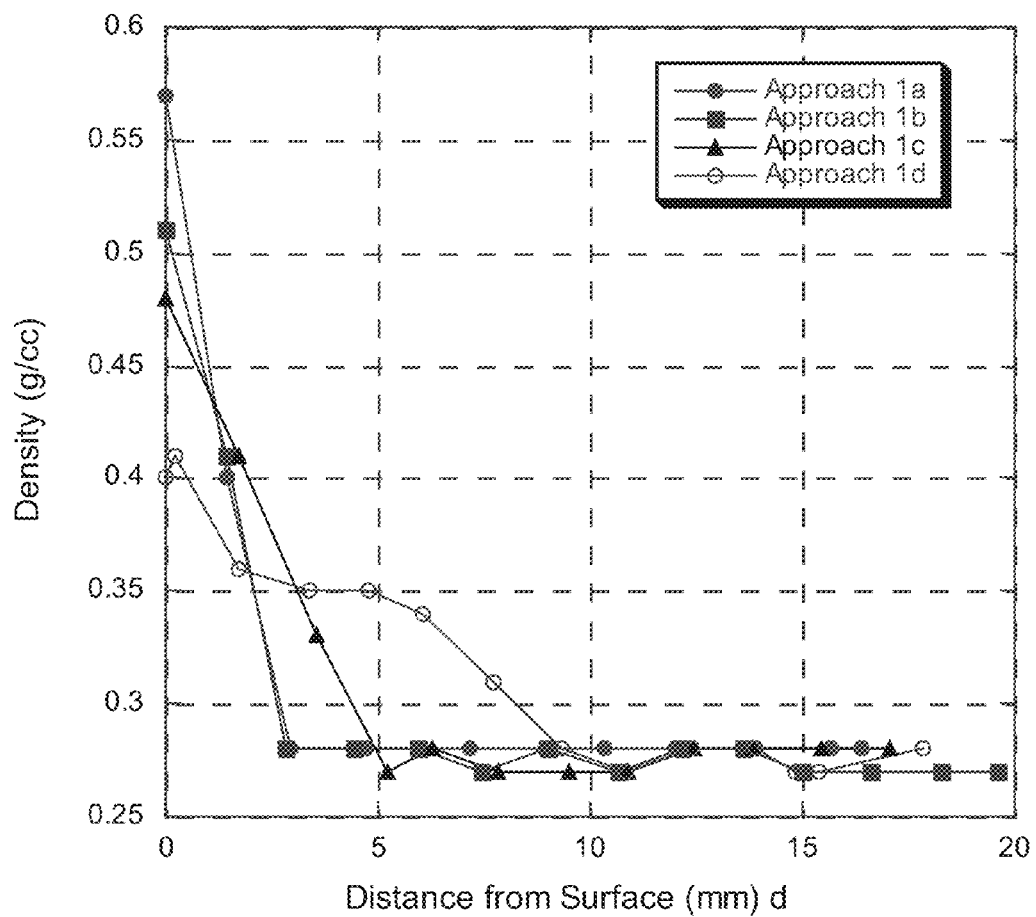
FIGS. 2-6 graphically illustrate measurements of material density values for PICA as a function of distance (d) into the material from an exposed surface, for substrate processing approaches 1a through 5d.

FIG. 2 graphically illustrates density change of the processed PICA near the surface for Approaches 1a-1d, with $m_r$=1 gm/in². As a result of this processing, density increases approximately monotonically from ρ=0.27 gm/cm³ (nominal for unprocessed PICA) at distances d≥10 mm from the surface to ρ=0.41, 0.48, 0.51 and 0.57 gm/cm³ as the surface (d=0) is approached for the Approaches 1d, 1c, 1b and 1a, respectively. Increasing the resin-to-solvent volume ratio appears to increase the near-surface density.

Figure 3:
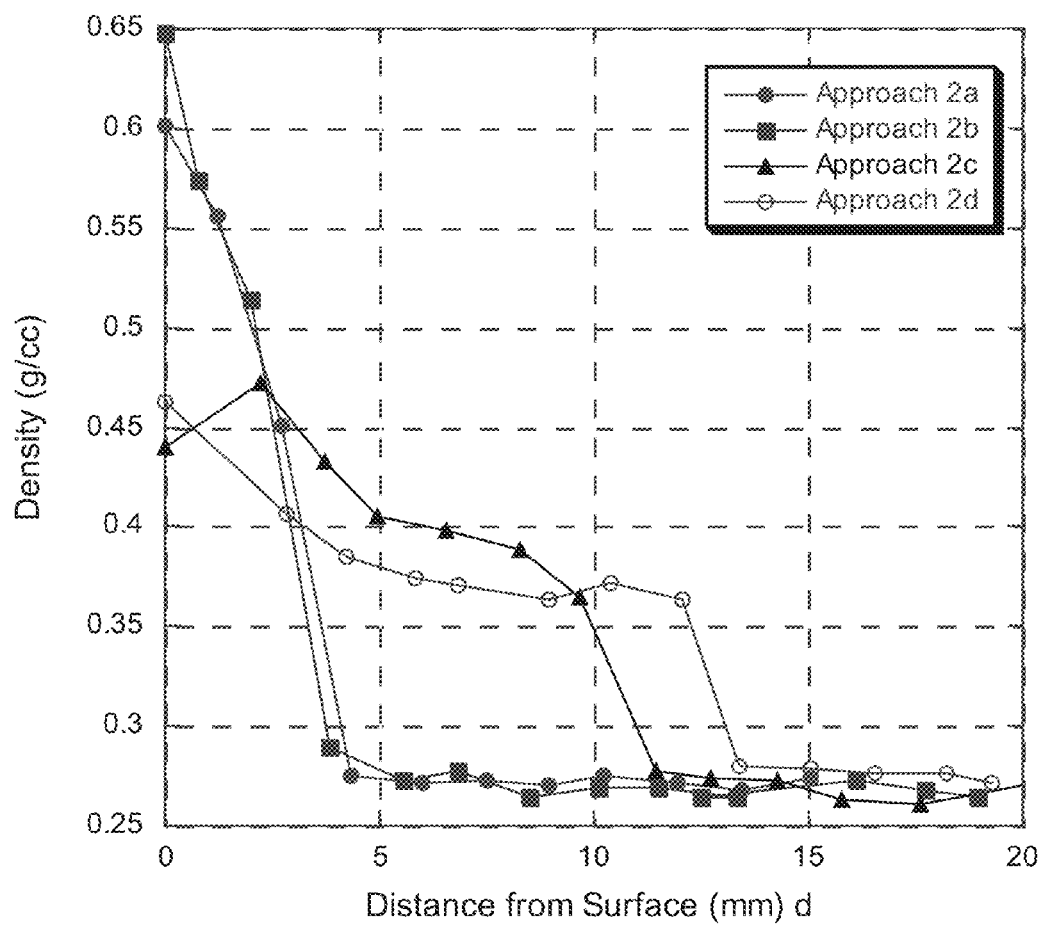

FIG. 3 graphically illustrates density change of processed PICA near the surface for Approaches 2a-2d, with $m_r$=1.9 gm/in². As a result of this processing, density increases approximately monotonically (except for Approach 2c, which is possibly anomalous) from ρ=0.26 gm/cm³ at distances d≥13 mm from the surface to ρ=0.44, 0.46, 0.60 and 0.65 gm/cm³ as the surface (d=0) is approached, for the Approaches 2c, 2d, 2a and 2b, respectively. In FIG. 3, variation of density ρ with resin-to-solvent ratio is more complex than in FIG. 2.

Figure 4:
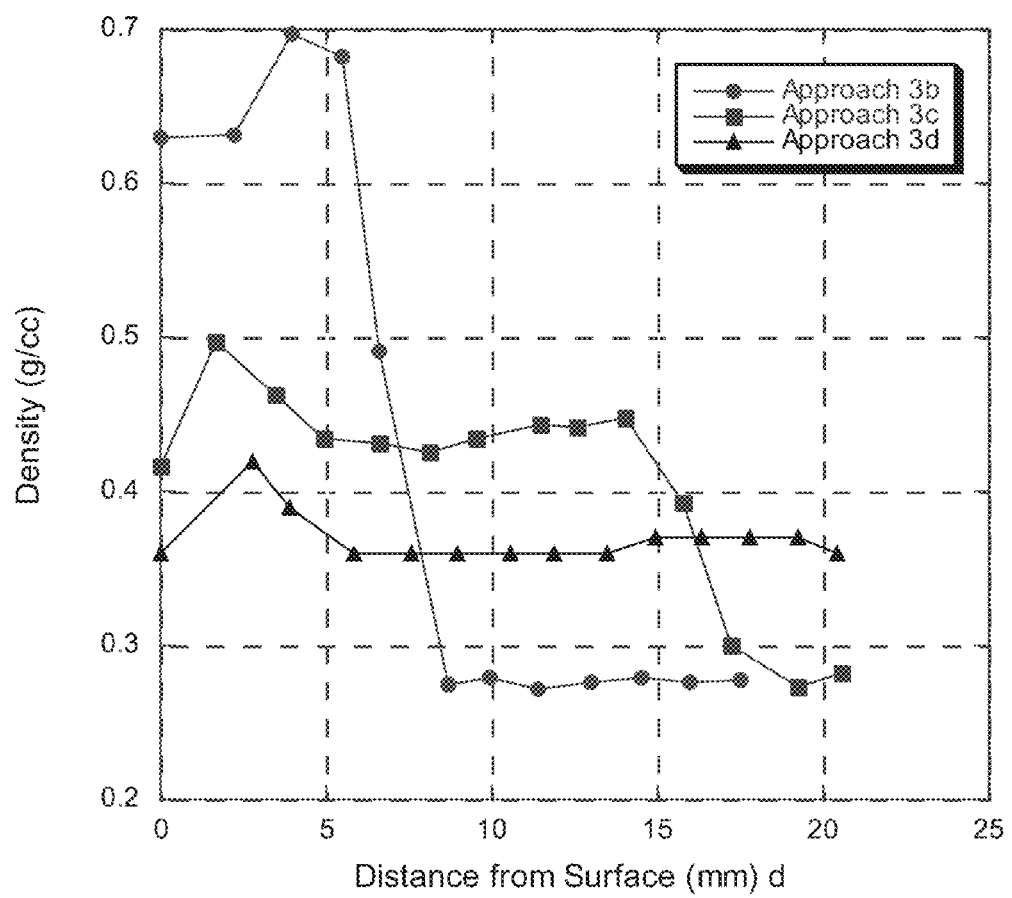

FIG. 4 graphically illustrates density change of processed PICA near the surface for Approaches 3b-3d, with $m_r$=3.8 gm/in². As a result of this processing, density increases from ρ=0.29 gm/cm³ at distances d≥19 mm from the surface to apparent maxima of ρ=0.42, 0.50 and 0.70 gm/cm³ as the surface (d=0) is approached, for the respective Approaches 3d, 3c and 3b. The result of the Approach 3d is unusual, and may be anomalous, in that density appears to be increased slightly for distances d greater than about 16 mm. It appears that increasing the resin mass parameter value $m_r$ above 1 produces a distance d(max) of maximum density that moves into the PPB (d(max)>0) as $m_r$ increases.

Figure 5:
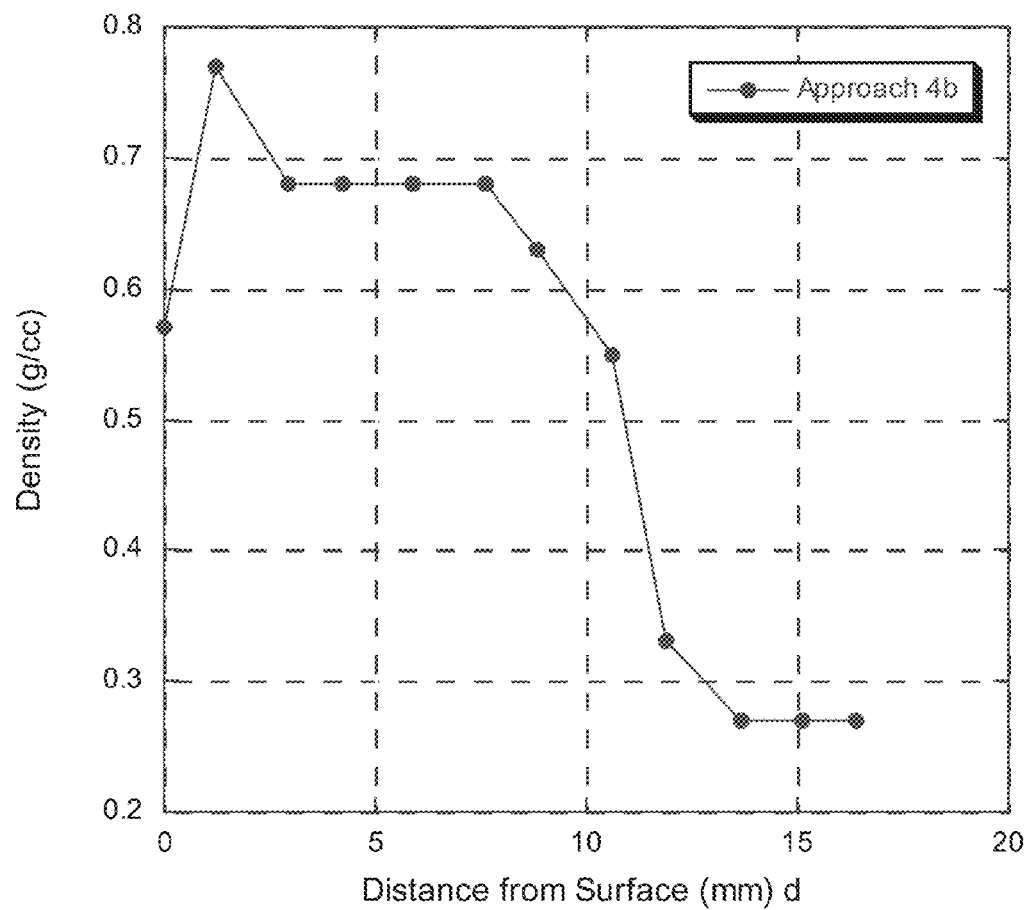

FIG. 5 graphically illustrates density change of processed PICA near the surface for the Approach 4b, with a resin mass parameter $m_r$=7.6 gm/in². The distance d(max) of maximum density, about ρ≈0.77 gm/cm³, occurs at a positive value, d(max)≈1.5 mm, from the surface. Beyond that distance the density decreases approximately monotonically with increasing distance d. Beyond d=13 mm, the density approaches a nominal density value. ρ≈0.28 gm/cm³. Density values near the surface (d=0-2 mm) may be anomalous for the Approach 4b.

Figure 6:
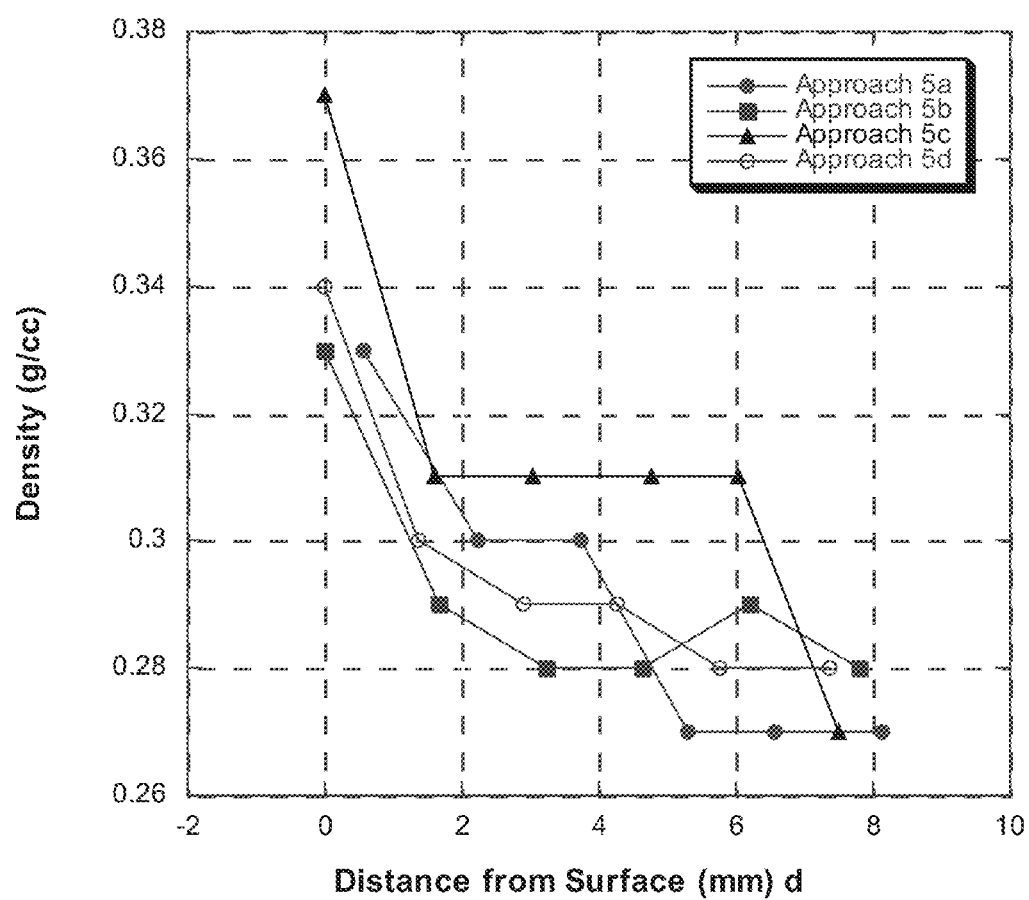

FIG. 6 graphically illustrates density change of processed PICA near the surface for Approaches 5a-5d, with $m_r$=0.3 gm/in² for Approaches 5a and 5b and $m_r$=0.6 gm/in² for Approaches 5c and 5d. Density increases approximately monotonically from ρ=0.27 gm/cm³ (nominal for unprocessed PICA) at distances d≥6 mm from the surface to ρ=0.33, 0.33, 0.37 and 0.34 gm/cm³ as the surface (d=0) is approached, for the respective Approaches 5a, 5b, 5c and 5d. Increasing the resin-to-solvent volume ratio $V_{r/s}$ appears to increase the surface density, and inversely.

TABLE 1

Chemical/Physical Parameters for Surface Densification Approaches.

| Approach | T1 (° C.) | T2 (° C.) | SD (g/in²) | $V_{r/s}$ | Max density |
|---|---|---|---|---|---|
| 1a | 50/amb | ambient | 1 | 1:0 | 0.57 (gm/cm³) |
| 1b | 50/amb | 50 | 1 | 1:0 | 0.51 |
| 1c | 50/amb | ambient | 1 | 2:1 | 0.48 |
| 1d | 50/amb | ambient | 1 | 1:1 | 0.41 |
| 2a | 50/amb | ambient | 1.9 | 1:0 | 0.65 |
| 2b | 50/amb | 50 | 1.9 | 1:0 | 0.60 |
| 2c | 50/amb | ambient | 1.9 | 2:1 | 0.46 |
| 2d | 50/amb | ambient | 1.9 | 1:1 | 0.44 |
| 3b | 50/amb | 50 | 3.8 | 1:0 | 0.70 |
| 3c | 50/amb | ambient | 3.8 | 2:1 | 0.50 |
| 3d | 50/amb | ambient | 3.8 | 1:1 | 0.42 |
| 4b | 50/amb | 50 | 7.6 | 1:0 | 0.28 |
| 5a | ambient | ambient | 0.3 | 1:2 | 0.34 |
| 5b | ambient | ambient | 0.3 | 1:5 | 0.37 |
| 5c | ambient | ambient | 0.6 | 1:2 | 0.33 |
| 5d | ambient | ambient | 0.6 | 1:5 | 0.37 |

Figure 7A:
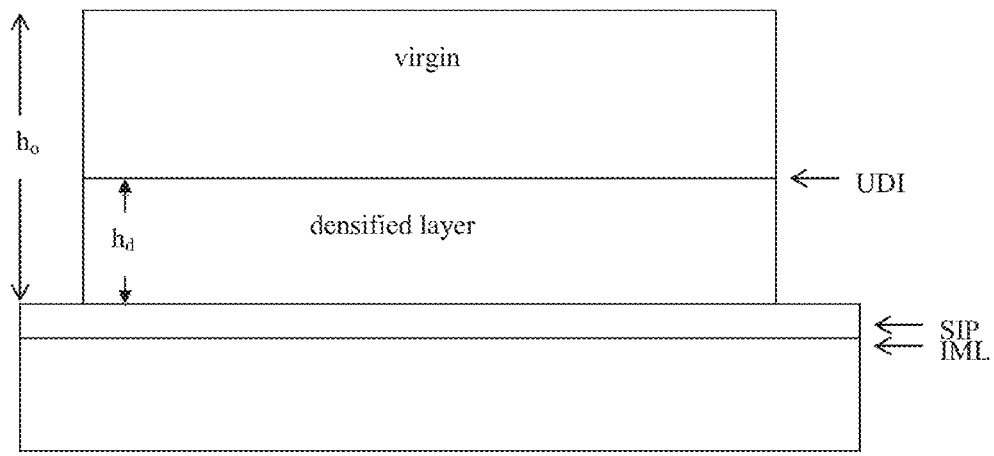
FIGS. 7a, 7b and 7c illustrate increased density regions and measured failure locations and recession depths for representative PPB bodies, for composite body processing approaches 1a through 5d and for an unmodified porous body.
Figure 7B:
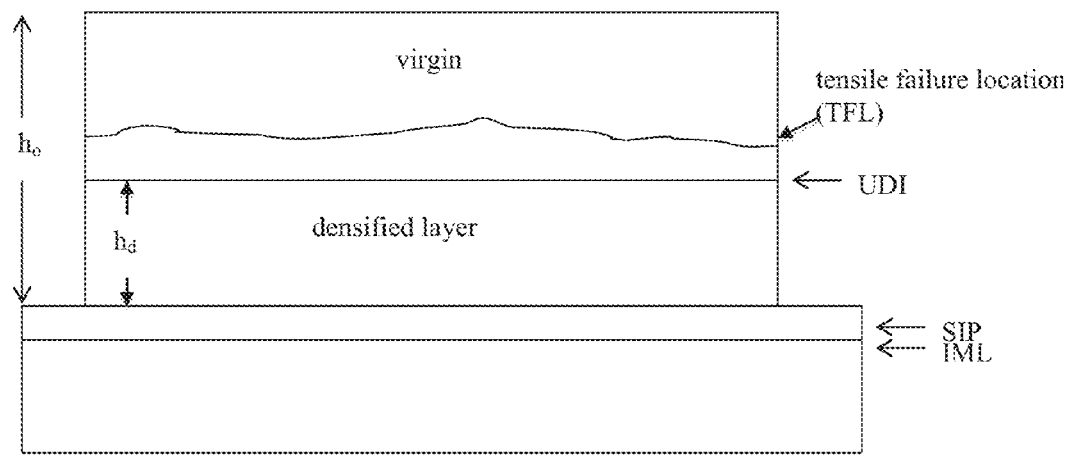

FIGS. 7A and 7B are illustrations, accurately representing tomographs of a composite body (e.g., PICA, with initial thickness $h_0$=2.54 cm, attached to a substrate) to which the surface densification process has been applied. FIGS. 7A and 7B represent a composite block using one of the Approaches 1a-5d, before failure testing in tensile mode (7A) and after failure testing in tensile mode (7B), illustrating that failure occurs in a region where none or relatively little of the sprayed phenolic substance is present, spaced apart from an undensified-densified interface UDI between densified and undensified (virgin) material, at a location TFL and separated from the PPB body/substrate interface or inner mold line IML. PPB body average density is increased locally by an estimated 5-60 percent, depending upon which of the Approaches 1a-5d is used. Where a densified layer is absent, failure occurs at the IML, with a reduced value of about 25 psi.

Figure 7C:
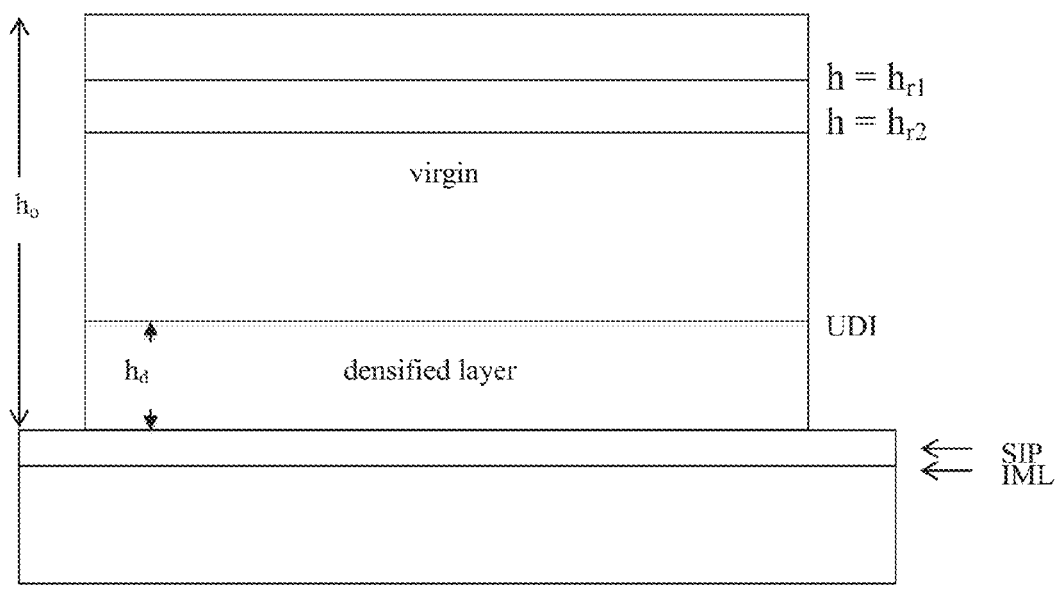
Figure 8:
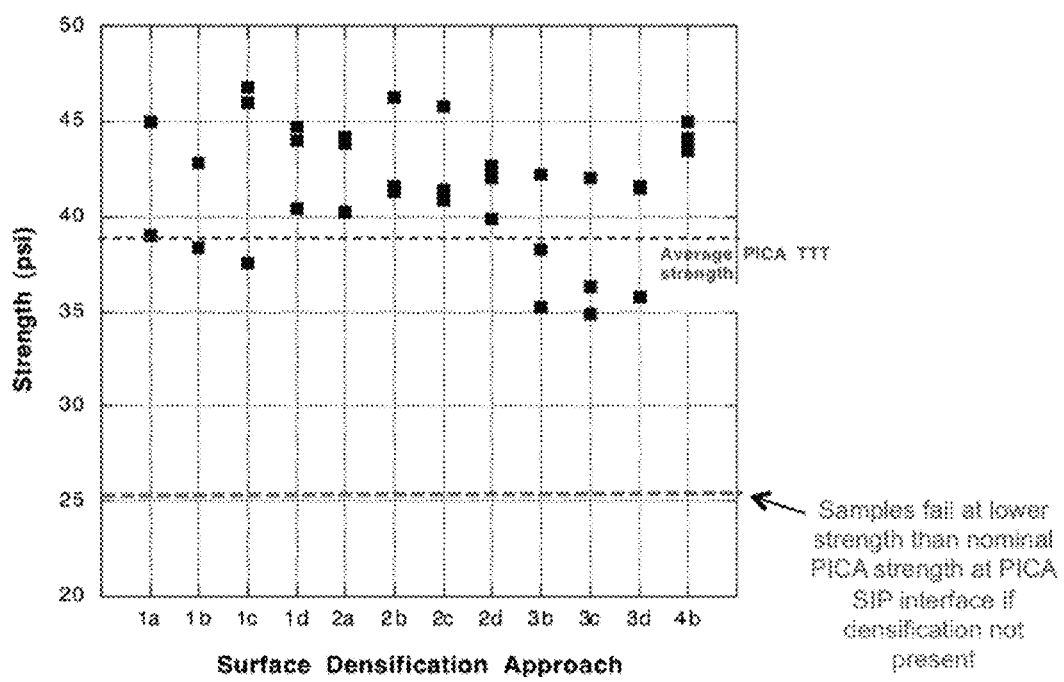
FIG. 8 graphically illustrates surface densification strength improvements.
Figure 9:
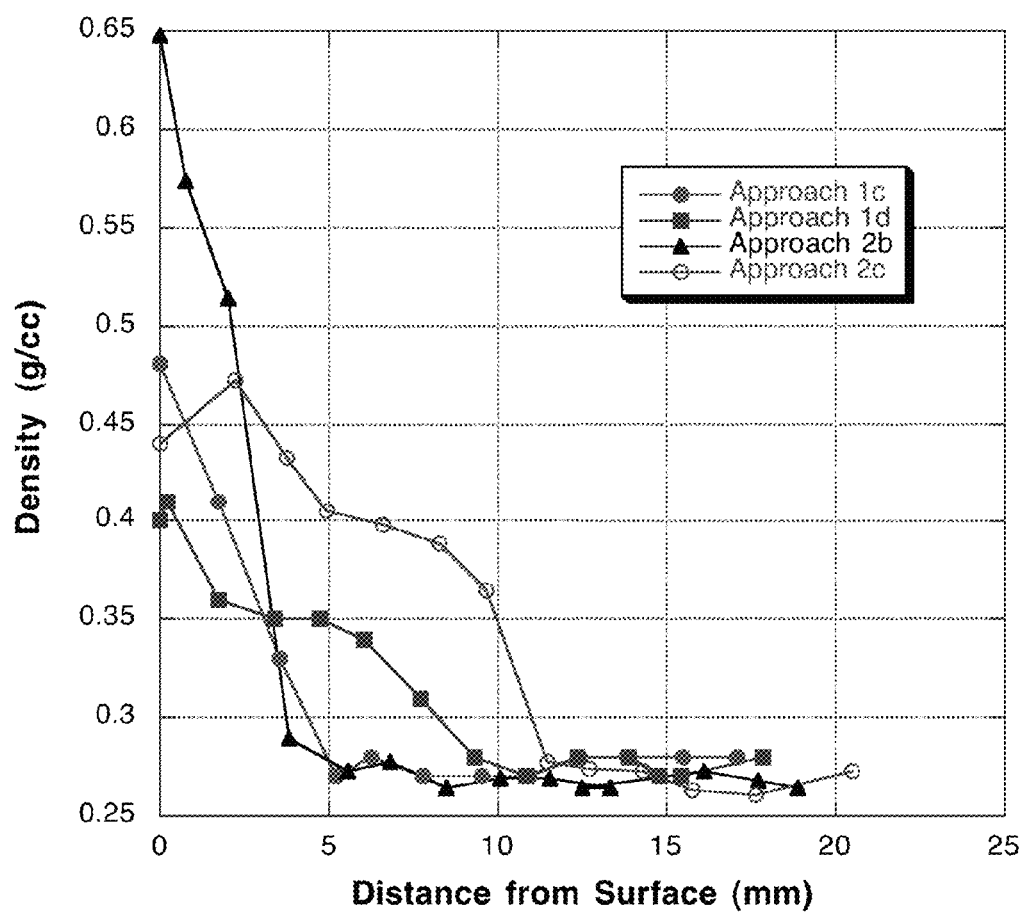
FIGS. 9 and 10 illustrate mass density versus distance from surface and rear surface temperature versus time for different densification approaches, where the material was ArcJet tested.

FIG. 7C represents a composite body of similar thickness in which the density is modified from a (top) exposed surface, and surface recession proceeds from the exposed surface downward. Recession occurs to a recession interface, $h=h_{r2}$ (non-dens), for a PPB body that is not surface-densified by the disclosed process, to a deeper level ($h_{r2}$ versus $h_{r1}$) than does recession to an interface,e $h=h_{r1}$, where the porous body is surface-densified to an interface UDI, by the disclosed process.

Surface densification can also be applied to a side wall of the PPBs body, to produce an interface UDI between densified material and virgin material, as in a tiled configuration. With this surface-densification of the sidewall in place, a depth of recession into the sidewall is also reduced, relative to the recession depth for unmodified PICA. In a tiled configuration, a gap is present between two otherwise-contiguous PPB blocks, and gap growth and side wall recession may occur through exposure of the gap and PPB block side wall to hot gases. An exposed surface ES is visibly more smooth where surface densification is applied.

Table 2 compares the failure locations and the failure strengths for unmodified blocks with surface-densified blocks (Approaches 1a-5d). The corresponding failure strengths are increased from (i) about 25 psi at the SIP-PICA interface for an unmodified (conventional) porous body block that is (i) constrained on one edge (IML) by a testing plate and (ii) unconstrained on all surfaces. The strength value for virgin PICA is about 39 psi. Where surface densification is provided, the failure strength increases to 40-42 psi (close to the known value for unprocessed virgin PICA) for porous body blocks with all surfaces unconstrained. Failure always occurs at or adjacent to the IML at the PICA-SIP interface in unmodified porous body material, and occurs in virgin porous body material, spaced apart from the interface, and even from an interface UDI separating the densified and virgin material (negligible densification), in surface-densified porous body material.

When the surface densification process is applied instead to an exposed surface or outer mold line OML, surface recession at this surface is reduced, as indicated in Table 3, which compares recession with and without densification. Additionally, the surface exposed to the flow is smoother, which reduces the flow turbulence that occurs in the presence of a rough exposed surface. A first process and a (different) second process may be optimal for densification of a surface adjacent to the IML and adjacent to the OML, respectively.

Surface densification, applied according to one of the Approaches disclosed here, increases the system failure strength to approximately the virgin porous body failure strength. Failure of the surface densified system only within the virgin porous body material, away from the IML, indicates that the surface densified portion of a densified porous body block, lying between the IML and the UDI, has a failure strength higher than the known failure strength of virgin porous body material.

TABLE 2

Failure Location and Failure Strength for Porous Body.

| Block Condition | Failure Strength | Failure Location |
| --- | --- | --- |
| Unmodified | 25 psi | At IML, at PICA SIP interface |
| Densified (Approaches 1a-4b) | 42 psi | Separ. from IML and from UDI |
| Densified (Approach 5a-5d) | 40 psi | Separ. from IML and from UDI |

Surface densification, according to one or more of the Approaches disclosed here, can be applied to other (partial or full) PPB materials, in addition to PICA and Fiberform™, to increase material density of the underlying material adjacent to one or more exposed surfaces, with a corresponding increase in density and in failure strength and some control over failure location. It appears that increase in phenolic density, adjacent to the surface, through diffusion to the UDI, may move the failure surface into the virgin material.

All surface-density-modified samples have failed at locations within the PPB body, spaced apart from the inner mold line IML, between substrate and PPB body, at tensile strength levels comparable to the original PPB tensile strength levels for PICA.

Surface-density-modified PPB and unmodified PPB materials have been tested against each other for the Approaches 1c, 1d, 2b and 2c, with reference to weight loss or surface recession in an ArcJet facility (760 Watts/cm$^2$ for $\Delta t=45$ sec duration). Measured recession from the outer mold line OML and measured weight loss are compared in Table 3 for two unmodified specimens and four density-modified specimens. Recession depths for the unmodified specimens are 17-47 percent higher than recession depths for the surface-density-modified specimens. Weight losses for the unmodified specimens are 8-17 percent higher than weight losses for the surface-density-modified specimens. Lower recession and lower weight loss values are preferred here.

TABLE 3

Comparison of Recession and Weight Loss for Various Specimens.

| Specimen | Surface Recession (mm) | Weight Loss (gm) |
| --- | --- | --- |
| Unmodif (223) | 12.737 | 41.89 |
| Unmodif (224) | 12.911 | 42.61 |
| Approach 1c | 10.122 | 36.1 |
| Approach 1d | 10.879 | 36.32 |
| Approach 2b | 8.903 | 38.92 |
| Approach 2c | 8.761 | 38.78 |

ArcJet heating has been performed for four Approaches 1c, 1d, 2b and 2c, monitoring from a surface exposed to ArcJet heating. The Approaches 2b and 2c have the highest modified densities within the first 10 mm from the surface, and have the lowest recession values and the lowest weight loss values.

Figure 10:
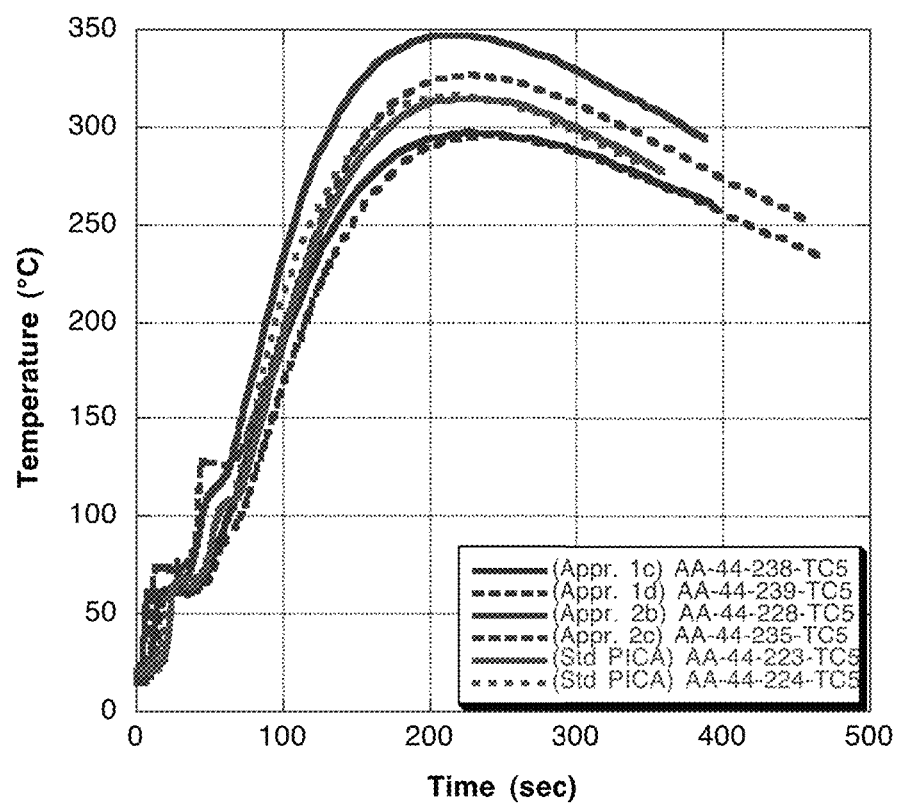

Temperatures at the back surface of a PICA block, for the six specimens of Table 3 and for unmodified PICA block samples are substantially the same, indicating that surface densification reduces surface recession rate and produces a more robust char, but does not appreciably alter the thermal performance of the PICA material at the back surface (FIG. 10).

Surface densification at the IML for the PICA block does not substantially change the physical dimensions of the PICA material. This feature is desirable where a block of PICA material has a "tight fit" (no room for growth in at least one direction).

Another advantage of a density-modified surfaces, vis-à-vis an unmodified surface, is that the density-modified surfaces appear to be "smoother," or to have smaller peak-to-valley distances perpendicular to the modified surface. This greater "smoothness" may manifest itself in enhanced laminar flow of heated air parallel to the density-modified surface, relative to an unmodified surface.

What is claimed is:

1. A method for modifying density of a surface region of a porous, open cell, phenolic bonded ("PPB") body to form a surface-densified PPB body, the method comprising:
   (1) providing a substrate, having first and second surfaces that are spaced apart by more than 20 mm, where the substrate is a PPB body having a selected temperature T1=20-80° C.;
   (2) depositing, on the first surface of the substrate, a selected deposited substance comprising a selected phenolic and a selected solvent and a selected resin-to-volume ratio $V_{r/s}$, at a deposit temperature T2≈20-80° C., and allowing the deposited substance to diffuse into the PPB body a distance no more than about 20 mm from the first surface;
   (3) allowing the PPB body to dry for a drying time interval of length Δt3≈6-48 hours at a drying temperature T3≈20-90° C., to allow at least a portion of the solvent to volatilize;
   (4) allowing the PPB body to set at a curing temperature T4≈60-90° C. for a curing time interval of length Δt4≈6-24 hours;
   (5) allowing the PPB body to set at a supplemental curing temperature T5≈100-150° C. for a supplemental curing time interval of length Δt5≈3-12 hours, after completion of the curing time interval, to form a surface-densified PPB body, having an undensified-densified interface UDI within the PPB body that is spaced apart from the first surface and spaced apart from the second surface, where a first region of the PPB body, lying on a first side of the UDI and including the first surface, has a majority of the deposited substance, and a second region of the PPB body, lying on a second side of the UDI and including the second surface, has approximately none of the deposited substance;
   (6) whereby, when the surface-densified PPB body is bonded to a stress isolation pad (SIP) at an interface with the first surface, to form a composite body, one or more of the quantities, T1, T2, T3, T4, T5, Δt3, Δt4, Δt5, the phenolic, the solvent and the ratio $V_{r/s}$, can be chosen so that, when a tensile failure test is performed on the composite body using the SIP, failure of the composite body occurs, if at all, at a location within the second region and spaced apart from the UDI.

2. The method of claim 1, further comprising choosing said PPB material to be phenolic impregnated carbon ablator (PICA).

3. The method of claim 1, further comprising choosing said phenolic material to comprise a phenol-formaldehyde resin that is created by polycondensation reactions between phenol and formaldehyde in the presence of several catalysts.

4. The method of claim 1, further comprising providing said phenolic with a mass in a range 0.3-7.6 gm/cm².

5. The method of claim 1, further comprising providing said deposited substance with said volume ratio $V_{r/s}$ of phenolic-to-solvent in a range of about 1:0 to 1:5.

6. The method of claim 1, further comprising providing said deposited substance with said volume ratio $V_{r/s}$ of phenolic-to-solvent in a range of about 1:1 to 2:1.

7. The method of claim 1, further comprising choosing said solvent to comprise at least one of ethanol, methanol, isopropyl alcohol, another selected alcohol, an ether, an aldehyde, a ketone, a carboxylic acid, and an ester.

8. A method for modifying density of a surface region of a porous, open cell, phenolic bonded ("PPB") body to form a surface-densified PPB body, the method comprising:
   (1) providing an initial substrate, having first and second surfaces that are spaced apart by more than 20 mm where the substrate is a PPB body having a selected temperature T1≈20-80° C.;
   (2) depositing, on the second surface of the substrate, a selected deposited substance comprising a selected phenolic and a selected solvent and a selected resin-to-volume ratio $V_{r/s}$, at a deposit temperature T2≈20-80° C., and allowing the deposited substance to diffuse into the PPB body a distance up to about 20 mm from the second surface;
   (3) allowing the PPB body to dry for a drying time interval of length Δt3≈6-48 hours at a drying temperature T3≈20-90° C., to allow at least a portion of the solvent to volatilize; and
   (4) allowing the PPB body to set at a curing temperature T4≈60-90° C. for a curing time interval of length Δt4≈6-24 hours;
   (5) allowing the PPB body to set at a curing temperature T5≈100-150° C. for a supplemental curing time interval of length Δt5≈3-12 hours, after completion of the curing time interval, to form a surface-densified PPB body, having an undensified-densified interface UDI within the PPB body that is spaced apart from the first surface and spaced apart from the second surface, where a first region of the PPB body, lying on a first side of the UDI and including the first surface, has approximately none of the deposited substance, and a second region of the PPB body, lying on a second side of the UDI and including the second surface, has a majority of the deposited substance;
   (6) whereby, when the second surface of the surface-densified PPB body is subjected to an elevated temperature that causes recession of at least a portion of the second surface, one or more of the quantities, T1, T2, T3, T4, T5, Δt3, Δt4, Δt5, the phenolic, the solvent and the ratio $V_{r/s}$, can be chosen so that a depth of recession d(dens) of the second surface is less than a depth of recession d(non-dens) that would occur in an initial substrate whose surface density has not been modified by one or more of the steps (1), (2), (3), (4) and (5).

9. The method of claim 8, further comprising choosing said PPB material to be phenolic impregnated carbon ablator (PICA).

10. The method of claim 8, further comprising choosing said phenolic material to comprise a phenol-formaldehyde resin that is created by polycondensation reactions between phenol and formaldehyde in the presence of several catalysts.

11. The method of claim 8, further comprising providing said phenolic with a mass in a range 0.3-7.6 gm/cm².

12. The method of claim 8, further comprising providing said deposited substance with said volume ratio $V_{r/s}$ of phenolic-to-solvent in a range of about 1:0 to 1:5.

13. The method of claim 8, further comprising providing said deposited substance with said volume ratio $V_{r/s}$ of phenolic-to-solvent in a range of about 1:1 to 2:1.

14. The method of claim 8, further comprising choosing said solvent to comprise at least one of ethanol, methanol, isopropyl alcohol, another selected alcohol, an ether, an aldehyde, a ketone, a carboxylic acid, and an ester.

* * * * *